United States Patent
Takeda et al.

(10) Patent No.: US 12,276,975 B2
(45) Date of Patent: Apr. 15, 2025

(54) ABNORMALITY DETECTING DEVICE, ABNORMALITY DETECTING METHOD, AND STORAGE MEDIUM

(71) Applicant: OMRON Corporation, Kyoto (JP)

(72) Inventors: Kazuhiro Takeda, Kyoto (JP); Shota Sakashita, Kyoto (JP); Naoya Hashimoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 626 days.

(21) Appl. No.: 17/621,685

(22) PCT Filed: Feb. 28, 2020

(86) PCT No.: PCT/JP2020/008498
§ 371 (c)(1),
(2) Date: Dec. 21, 2021

(87) PCT Pub. No.: WO2021/014670
PCT Pub. Date: Jan. 28, 2021

(65) Prior Publication Data
US 2022/0357732 A1  Nov. 10, 2022

(30) Foreign Application Priority Data

Jul. 23, 2019  (JP) .................................. 2019-135695

(51) Int. Cl.
*G05B 23/02* (2006.01)
*G06F 18/22* (2023.01)

(52) U.S. Cl.
CPC ......... *G05B 23/0218* (2013.01); *G06F 18/22* (2023.01); *G05B 2219/34465* (2013.01)

(58) Field of Classification Search
CPC ...... G05B 23/0218; G05B 2219/34465; G06F 18/22
See application file for complete search history.

(56) References Cited

U.S. PATENT DOCUMENTS

| | | | |
|---|---|---|---|
| 5,119,311 A | | 6/1992 | Gold et al. |
| 5,692,404 A | * | 12/1997 | Kirii ................... G01L 5/0076 72/15.1 |
| 2003/0117279 A1 | * | 6/2003 | Ueno ................. G08B 21/0423 340/523 |
| 2005/0193027 A1 | * | 9/2005 | Hasegawa .............. G03G 15/55 |

(Continued)

FOREIGN PATENT DOCUMENTS

| | | |
|---|---|---|
| CN | 103596493 | 2/2014 |
| CN | 109725625 | 5/2019 |

(Continued)

OTHER PUBLICATIONS

"Search Report of Europe Counterpart Application", issued on Jun. 23, 2023, pp. 1-8.

(Continued)

*Primary Examiner* — Alexander Satanovsky
*Assistant Examiner* — Sharah Zaab
(74) *Attorney, Agent, or Firm* — JCIPRNET

(57) ABSTRACT

An abnormality in a device of interest is detected on the basis of the distance from a predetermined reference curve to a point represented by a first index value and a second index value in a two-dimensional plane having the first index and the second index as axes.

11 Claims, 10 Drawing Sheets

(56) References Cited

U.S. PATENT DOCUMENTS

| | | | |
|---|---|---|---|
| 2005/0194590 A1* | 9/2005 | Matsushita | G05B 23/0248 |
| | | | 438/15 |
| 2016/0239015 A1 | 8/2016 | Heiler et al. | |
| 2017/0307480 A1* | 10/2017 | Uchida | G01M 15/02 |
| 2018/0043649 A1* | 2/2018 | Kurokawa | B30B 15/28 |

FOREIGN PATENT DOCUMENTS

| | | | | |
|---|---|---|---|---|
| EP | 0733435 | | 1/2003 | |
| JP | 2006158031 | | 6/2006 | |
| JP | 2008287478 | * | 11/2008 | G06T 7/00 |
| JP | 2016209885 | | 12/2016 | |
| JP | 2019003389 | | 1/2019 | |
| JP | 2019104039 | | 6/2019 | |

OTHER PUBLICATIONS

Office Action of China Counterpart Application, with English translation thereof, issued on Feb. 12, 2023, pp. 1-22.

"International Search Report (Form PCT/ISA/210) of PCT/JP2020/008498," mailed on May 26, 2020, with English translation thereof, pp. 1-4.

"Written Opinion of the International Searching Authority (Form PCT/ISA/237) of PCT/JP2020/008498," mailed on May 26, 2020, with English translation thereof, pp. 1-8.

* cited by examiner

ABNORMALITY DETECTING DEVICE, ABNORMALITY DETECTING METHOD, AND STORAGE MEDIUM

CROSS-REFERENCE TO RELATED APPLICATION

This application is a 371 application of the International PCT application serial no. PCT/JP2020/008498, filed on Feb. 28, 2020, which claims the priority benefits of Japan Patent Application No. 2019-135695, filed on Jul. 23, 2019. The entirety of each of the above-mentioned patent applications is hereby incorporated by reference herein and made a part of this specification.

TECHNICAL FIELD

The present invention relates to an abnormality detecting device, an abnormality detecting method, and a storage medium that detect an abnormality of a target device.

RELATED ART

Conventionally, a technique is known to detect a press abnormality based on a load waveform of a press load when pressing a work in a press system (see, for example, Patent Document 1).

Further, a technique is known to control a motor by using a probability density function depending on the speed of a servomotor (see, for example, Patent Document 2).

The technique described in Patent Document 1 or Patent Document 2 determines whether an abnormality occurs according to whether a measured value of the device in a machining operation for machining the work is within the standard deviation.

CITATION LIST

Patent Literature

[Patent Document 1] Japanese Patent Laid-Open No. 2016-209885
[Patent Document 2] Japanese Patent Laid-Open No. 2006-158031

SUMMARY OF INVENTION

Technical Problem

In addition, in a target device using a servomotor as a power source, the prediction curve of the press load or the motor speed during the machining operation may sometimes have a steep part during the machining operation. In a case where whether an abnormality occurs is determined based on whether the measured value of the device in the machining operation is within the standard deviation as in the related art described above, when the prediction curve is steep, it is likely to determine that there is an abnormality even though no abnormality occurs.

One aspect of the present invention has been made in view of the above circumstances, and an objective of the present invention is to provide a technique capable of appropriately performing an abnormality determination.

Solution to Problem

To solve the above problems, an abnormality detecting device according to an aspect of the present invention is an abnormality detecting device detecting an abnormality of a target device, and includes an acquisition part and an abnormality detecting part. The acquisition part acquires a first index value associated with a first index and a second index value associated with a second index in an operation of the target device. The abnormality detecting part detects an abnormality of the target device based on a distance from a predetermined reference curve to a point indicated by the first index value and the second index value on a two-dimensional plane with the first index and the second index being axes.

Further, to solve the above problems, an abnormality detecting method according to an aspect of the present invention is an abnormality detecting method executed in an abnormality detecting device detecting an abnormality of a target device, and includes: an index value acquisition step of acquiring a first index value associated with a first index and a second index value associated with a second index in an operation of the target device; and an abnormality detecting step of detecting an abnormality of the target device based on a distance from a predetermined reference curve to a point indicated by the first index value and the second index value on a two-dimensional plane with the first index and the second index being axes.

Further, an abnormality detecting program according to an aspect of the present invention is an abnormality detecting program for causing a computer to function as the above abnormality detecting device, and causes a computer to function as the acquisition part and the abnormality detecting part.

Effects of Invention

According to an aspect of the present invention, it is possible to appropriately perform an abnormality determination of a target device.

DESCRIPTION OF EMBODIMENTS

Hereinafter, an embodiment (hereinafter also referred to as "the present embodiment") according to one aspect of the present invention will be described with reference to the drawings.

§ 1 Application Example

Figure 1:
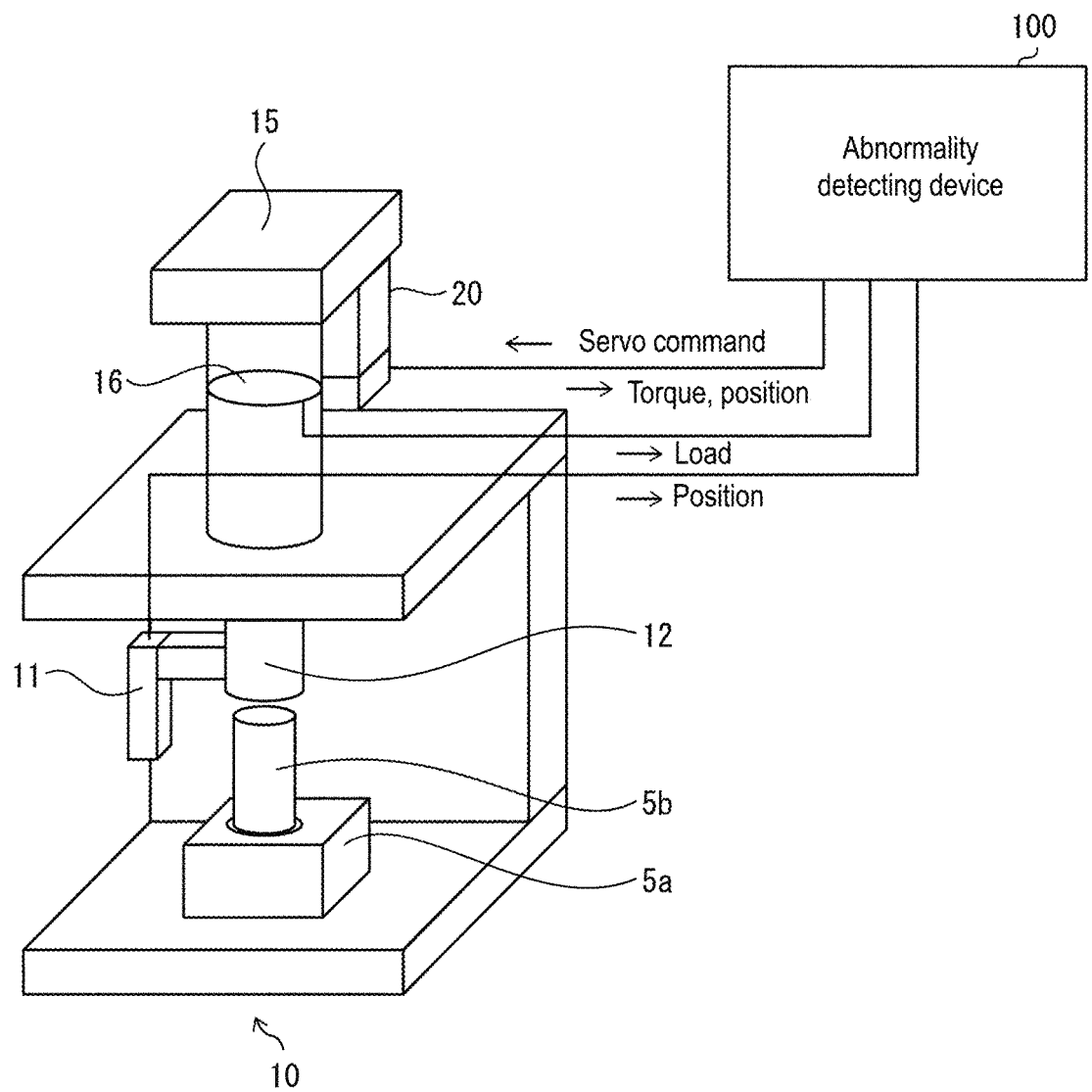
FIG. 1 is a view schematically showing a site where an abnormality detecting device according to the present embodiment is used.

An example of a situation in which the present invention is applied will be described with reference to FIG. 1. FIG. 1 is a view schematically showing a site where an abnormality detecting device 100 according to the present embodiment is used.

As shown in FIG. 1, the abnormality detecting device 100 is, for example, a device used at a production site to detect an abnormality of a target device 10. The abnormality detecting device 100 is realized by, for example, a PLC (programmable controller). In a configuration in which the abnormality detecting device 100 is realized by a PLC, the abnormality detecting device 100 may have a configuration that controls the operation of the target device 10. The abnormality detecting device 100 is connected to one or more target devices 10 via a network such as a field network or a local network.

The target device 10 is, for example, a press machine driven by a servomotor as a power source. The press machine, which is an example of the target device 10, rotates a servomotor 20, converts the rotational motion of the servomotor 20 into a linear motion by an actuator 15, and press-fits a press-fitting work 5b into a press-fitted work 5a via a press tool 12.

When the press tool 12 of the press machine performs press-fitting repeatedly, the contact surface with the press-fitting work 5b wears. As the wearing of the press tool 12 continues, metal powder is generated, and at the time of press-fitting, if the metal powder is brought into a space between the press-fitting work 5b and the press-fitted work 5a, an abnormality of foreign matter biting, an abnormality in which the press tool cannot be pulled out, etc. occurs.

The abnormality detecting device 100 has a function of collecting, learning, and monitoring data related to the operation of the target device 10. From the target device 10, the abnormality detecting device 100 acquires, for example, information such as a torque, a speed, and a position of the servomotor, information of a load applied to the press tool 12 measured by a load cell 16, and a sensor value (position) detected by a displacement sensor 11.

Based on the data related to the operation of the target device 10, the abnormality detecting device 100 acquires a first index value associated with a first index, e.g., a value related to a stage of the operation of the target device 10, and a second index value associated with a second index, e.g., a value related to a load of the operation of the target device 10, and with reference to these two index values, determines whether an abnormality occurs in the target device 10.

Specifically, the abnormality detecting device 100 determines whether an abnormality occurs in the target device 10 based on a distance from a predetermined reference curve to a point indicated by the first index value and the second index value on a two-dimensional plane with the first index and the second index being axes.

Accordingly, the abnormality detecting device 100 can monitor from the start of the machining operation to the end of the machining operation of the target device 10 and detect an abnormality sign at an early stage. Further, even in a situation in which the sensor value suddenly changes in the operation process of the target device 10, it is possible to appropriately determine whether an abnormality occurs. Further, by performing an abnormality determination using a value related to the stage of the operation of the target device 10 and a value related to the load of the operation of the target device 10, it is possible to appropriately perform an abnormality determination at each stage of the operation of the target device 10.

§ 2 Configuration Example

Embodiment 1

Hereinafter, an embodiment of the present invention will be described in detail.

(Regarding Configuration of Abnormality Detecting Device 100)

Figure 2:
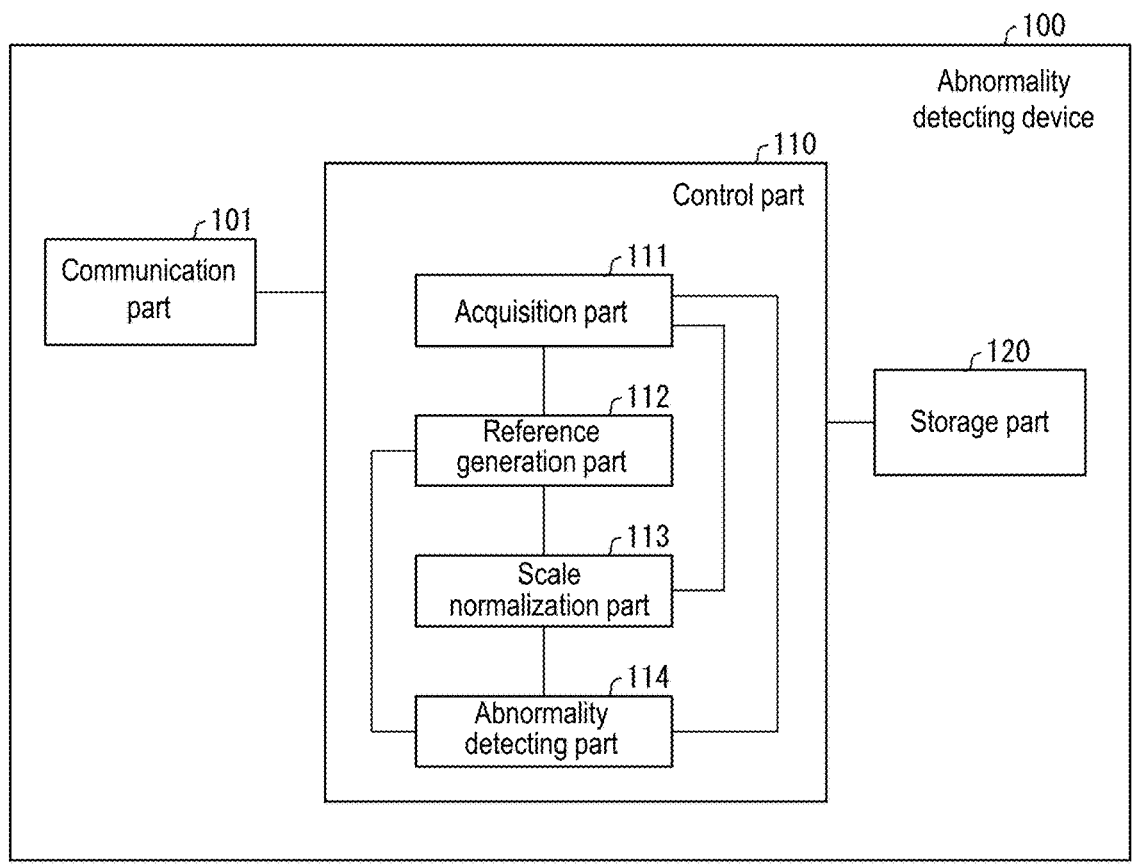
FIG. 2 is a block diagram showing a main configuration of the abnormality detecting device.

FIG. 2 is a block diagram showing a main configuration of the abnormality detecting device 100. As shown in FIG. 2, the abnormality detecting device 100 includes a communication part 101, a control part 110, and a storage part 120.

The communication part 101 performs communication with the target device 10 via a network and executes transmission/reception of data. The communication part 101 is realized using, for example, an integrated circuit (IC) such as a communication IC. The communication part 101 performs communication with the target device 10 by wired communication or wireless communication.

The control part 110 is a computation device having a function of comprehensively controlling each part of the abnormality detecting device 100. The control part 110 may control each part of the abnormality detecting device 100 by, for example, executing a program stored in one or more memories (e.g., a RAM or a ROM) by one or more processors (e.g., a CPU).

The storage part 120 stores various data used by the control part 110 and various software executed by the control part 110. Further, the storage part 120 stores data related to the operation of the target device 10 acquired and learned from the target device 10 by the control part 110.

(Regarding Configuration of Control Part 110)

The control part 110 includes an acquisition part 111, a reference generation part 112, a scale normalization part 113, and an abnormality detecting part 114.

The acquisition part 111 acquires a first index value associated with a first index and a second index value associated with a second index in the operation of the target device 10 via the communication part 101. The value of the first index and the value of the second index in the operation of the target device 10 are values related to a position, a torque, a load applied to the press tool 12 (a load applied to the press-fitting work 5b), etc. indicated by the servomotor 20, the displacement sensor 11, or the load cell 16 of the target device 10. The load applied to the press tool 12 may also be estimated from the torque of the servomotor 20.

The reference generation part 112 collects the first index value and the second index value acquired by the acquisition part 111 from the target device 10, and generates a regression prediction model, which is a method of machine learning, for the collected first index value and second index value. From the result of machine learning, the reference generation part 112 sets a reference curve on a two-dimensional plane with the first index and the second index being axes. The reference curve represents a relationship between the first index value and the second index value in a normal state of the target device 10. The abnormality detecting device 100 may also acquire information indicating the reference curve in advance from outside.

The first index value associated with the first index is a value related to the stage of the operation of the target device 10, and when the target device 10 is a servo press machine, the first index value is, for example, a value indicating a degree of progress in a series of press operation (a value indicating a percentage at which the process has progressed from the start to the end of a series of press operation, e.g., the position of the servomotor 20 or the position of the press tool 12), or an elapsed time from the start of a series of press operation. The second index value associated with the second index is a value related to a load of the target device 10.

The first index value and the second index value are not limited to a value indicating a degree of progress in a series of press operation and a value related to a load (a load of the load cell) of the target device 10, but values such as the position, torque, and speed of the servomotor, and measured values associated with the target device 10 may be appropriately selected and used.

The scale normalization part 113 individually normalizes each of the scale of the first index and the scale of the second index on the two-dimensional plane with the first index and the second index being axes. Based on the result of machine learning of the first index value and the second index value by the reference generation part 112, the scale normalization part 113 normalizes the scale of the first index and the scale of the second index. A reference curve may be set for the two-dimensional plane with the normalized scales. In this manner, by appropriately normalizing each index value and performing the abnormality determination, it is possible to appropriately perform the abnormality determination.

Figure 3:
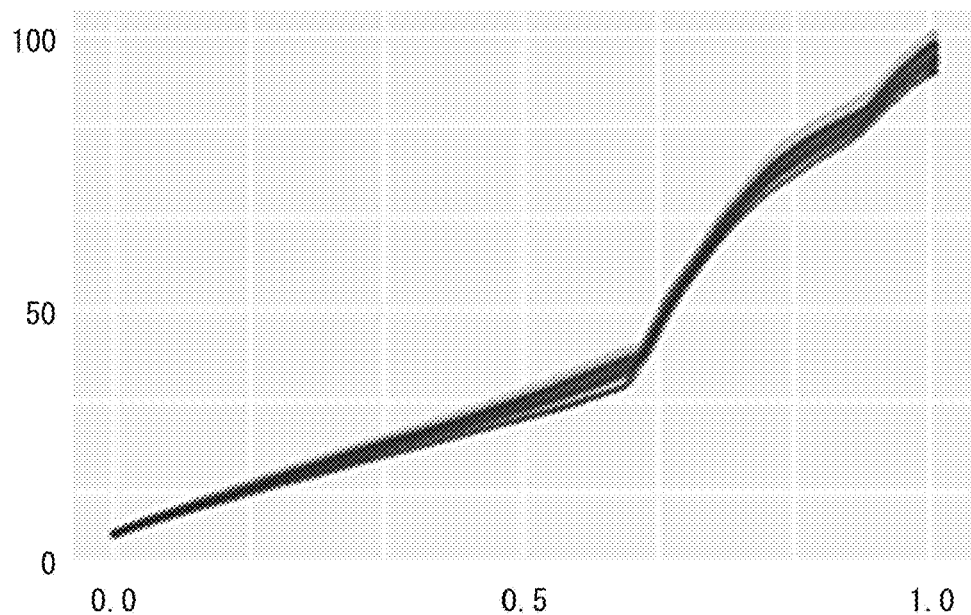
FIG. 3 is a graph showing measured values of a first index value and a second index value.

FIG. 3 is a graph showing the first index value and the second index value in the press operation performed multiple times collected from the target device 10 which is a servo press machine, in which the first index (position) is the horizontal axis, and the second index (load) is the vertical axis.

Figure 4:
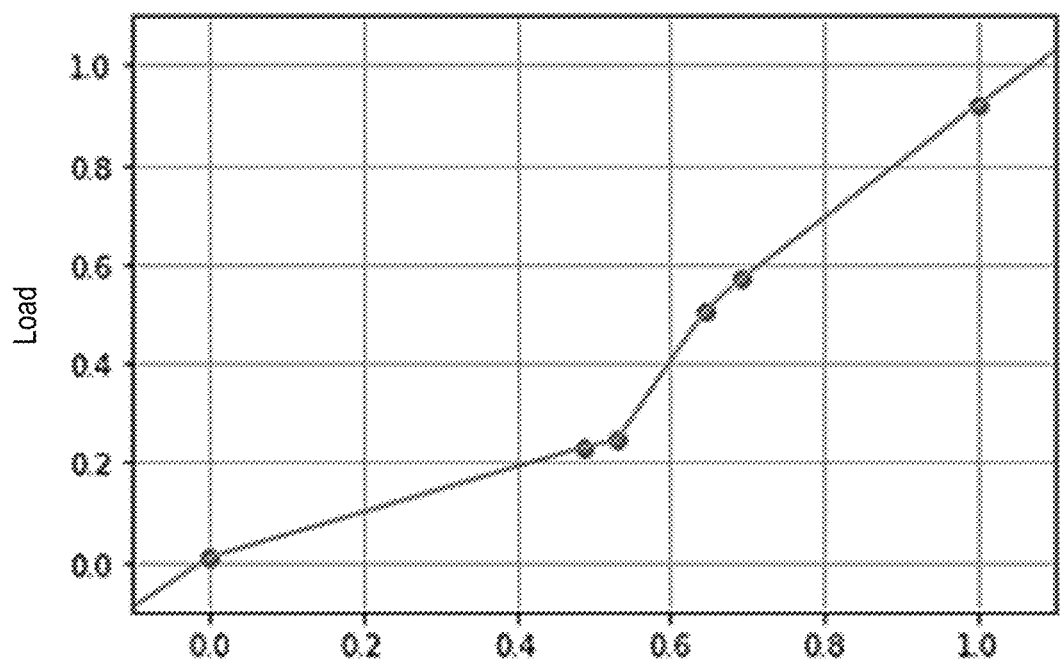
FIG. 4 is a graph showing a reference curve.

FIG. 4 a graph showing a reference curve set by the reference generation part 112 using the scales normalized by the scale normalization part 113 using the collected data shown in FIG. 3. As shown in FIG. 4, the reference curve set according to machine learning by the reference generation part 112 is, for example, a line graph. In the reference curve, the horizontal axis shows a value (e.g., position) related to the stage of the operation of the target device 10, which is the first index value associated with the first index normalized by the scale normalization part 113, and the vertical axis shows a value related to the load, which is the second index value associated with the second index normalized by the scale normalization part 113. The reference curve may be, for example, a correlation diagram between the position of the servomotor and the load applied to the press tool, or a correlation diagram between the speed of the servomotor and the torque of the servomotor.

The reference curve is, for example, a line graph which is a regression prediction model f(x) represented by (Formula 1) below. $y_{ideal}$ indicates the second index value on the reference curve. $x_{norm}$ indicates the normalized first index value.

[Math. 1]

$$y_{ideal} = f(x_{norm}) \quad \text{(Formula 1)}$$

The abnormality detecting part 114 detects an abnormality of the target device 10 based on a distance from the reference curve to a point indicated by the first index value and the second index value on the two-dimensional plane with the first index and the second index being axes.

Figure 5:
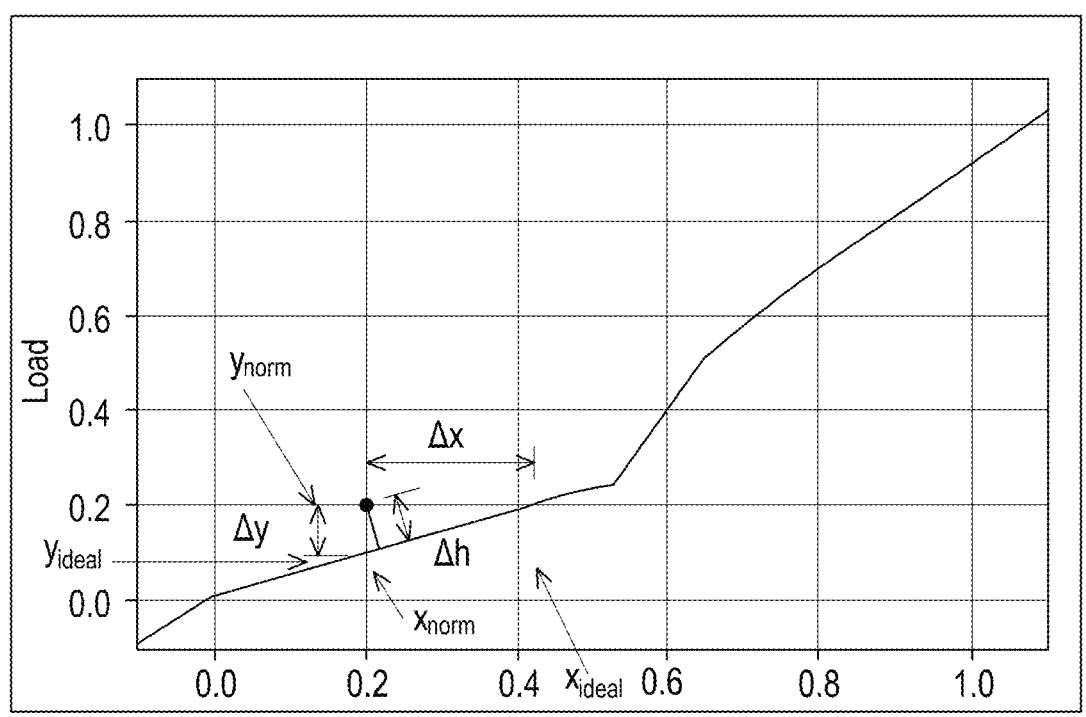
FIG. 5 is a graph showing a reference curve based on a regression prediction model f(x).

FIG. 5 is a view showing parameters related to the first index value associated with the first index and the second index value associated with the second index on the reference curve of the regression prediction model f(x). The horizontal axis is the first index (x) indicating the stage of the operation, and the vertical axis is the second index (y).

The scale normalization part 113 first obtains $x_{norm}$ and $y_{norm}$ obtained by normalizing a measured value $x_{act}$ of the first index value and a measured value $y_{act}$ of the second index value acquired by the acquisition part 111, using (Formula 2) and (Formula 3) below.

[Math. 2]

$$x_{norm} = (x_{act} - x_{min})/(x_{max} - x_{min}) \quad \text{(Formula 2)}$$

[Math. 3]

$$y_{norm} = (y_{act} - y_{min})/(y_{max} - y_{min}) \quad \text{(Formula 3)}$$

Herein, $x_{min}$ and $y_{min}$ may respectively be minimum values of the measured values $x_{act}$ and $y_{act}$ of the first index value and the second index value stored in the storage part 120, or minimum values of the first index value and the second index value on the reference curve. Further, $x_{max}$ and $y_{max}$ may respectively be maximum values of the measured values $x_{act}$ and $y_{act}$ of the first index value and the second index value stored in the storage part 120, or maximum values of the first index value and the second index value on the reference curve. Normalization is performed to match the scale of the first index and the scale of the second index.

Subsequently, the abnormality detecting part 114 obtains $y_{ideal}$ for the normalized first index value $x_{norm}$ using (Formula 1). The abnormality detecting part 114 obtains $x_{ideal}$ for the normalized second index value $y_{norm}$ using (Formula 4) below. $x_{ideal}$ indicates the first index value on the reference curve. g(y) is the inverse function of f(x). $y_{ideal}$ indicates the second index value (ideal value of the second index) when the first index value is $x_{norm}$ in the case where the target device 10 is normal. $x_{ideal}$ indicates the first index value (ideal value of the first index) when the second index value is $y_{norm}$ in the case where the target device 10 is normal.

[Math. 4]

$$x_{ideal} = g(y_{norm}) \quad \text{(Formula 4)}$$

Next, the abnormality detecting part 114 obtains Δx and Δy which are deviations of the normalized first index value $x_{norm}$ and second index value $y_{norm}$ from their respective ideal values $x_{ideal}$ and $y_{ideal}$ using (Formula 5) and (Formula 6) below.

[Math. 5]

$$\Delta x = x_{ideal} - x_{norm} \quad \text{(Formula 5)}$$

[Math. 6]

$$\Delta y = y_{norm} - y_{ideal} \quad \text{(Formula 6)}$$

The abnormality detecting part 114 calculates a distance Δh from the reference curve to the point indicated by the first index value and the second index value according to (Formula 7) below using the deviations Δx and Δy of the first index value and the second index value deviating from the ideal values $x_{ideal}$ and $y_{ideal}$.

[Math. 7]

$$\Delta h = h(\Delta x, \Delta y) \quad \text{(Formula 7)}$$

In addition, for example, when $\Delta y$ is a predetermined value $\varepsilon$ or less, or when $|\Delta y|$ is a predetermined value $\varepsilon$ or less, $\Delta h=0$ and the error from the reference curve may be ignored.

In this manner, the abnormality detecting part 114 detects an abnormality of the target device 10 based on the distance $\Delta h$ from the predetermined reference curve to the point indicated by the first index value and the second index value on the two-dimensional plane with the first index and the second index being axes. Accordingly, even at a process position where the slope changes sharply on the reference curve, the abnormality detecting device 100 can appropriately perform abnormality detection, and can suppress determination that there is an abnormality even though an abnormality does not occur.

Figure 6:
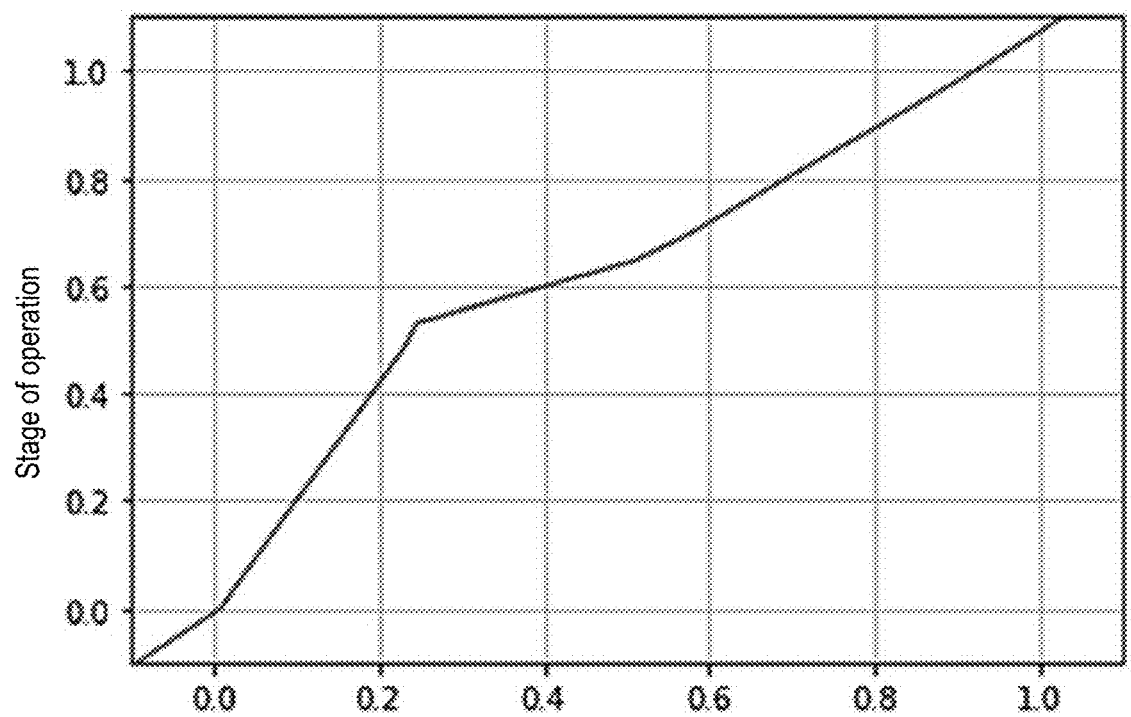
FIG. 6 is a graph showing a reference curve based on an inverse regression prediction model g(y).

FIG. 6 is a graph showing a reference curve based on the inverse regression prediction model g(y). The vertical axis is the first index (x) indicating the stage of the operation, and the horizontal axis is the second index (y). As shown in FIG. 6, the reference curve is not limited to the configuration indicated by the regression prediction model f(x), but may also have a configuration indicated by the inverse regression prediction model g(y). Even when the reference curve is indicated by the inverse regression prediction model g(y), the abnormality detecting part 114 can calculate the distance $\Delta h$ from the reference curve to the point indicated by the first index value and the second index value according to the above method using (Formula 1) to (Formula 7).

Figure 7:
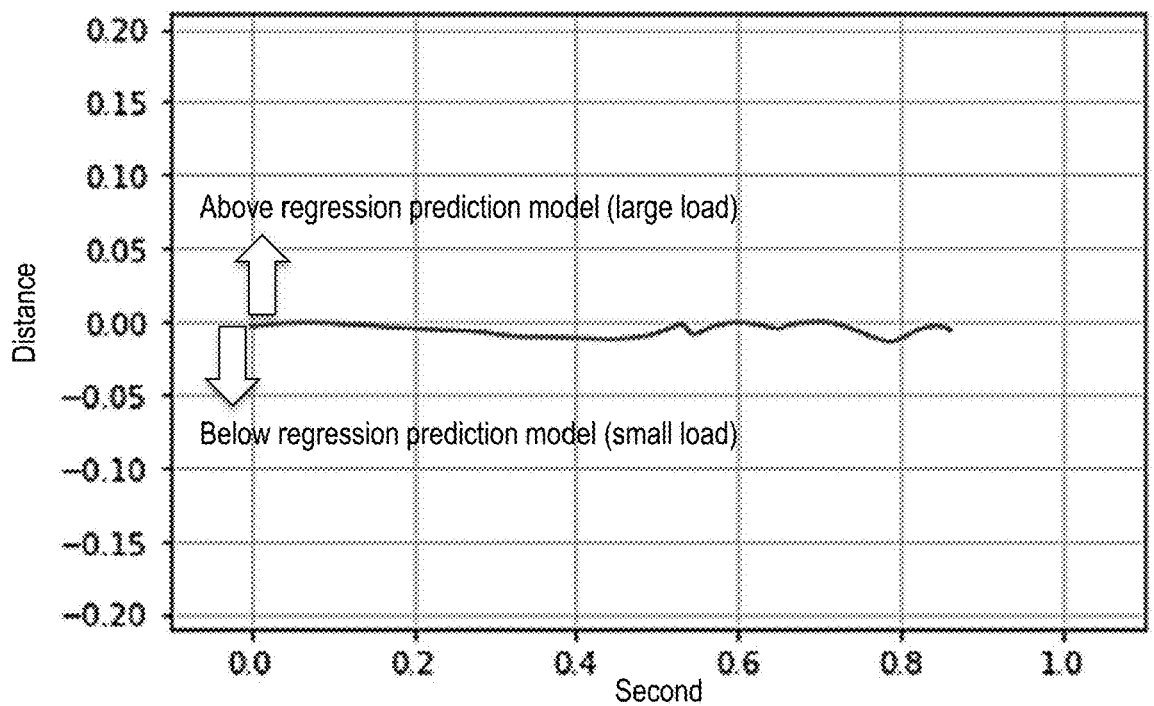
FIG. 7 is a view showing a time change of $\Delta h$.

FIG. 7 is a view showing a time change of the distance $\Delta h$. The horizontal axis is the time (first index), and the vertical axis is the distance $\Delta h$. As shown in FIG. 7, the abnormality detecting part 114 assigns a positive sign to the distance $\Delta h$ when the second index value (load) is on the large side with respect to the reference curve. Further, the abnormality detecting part 114 assigns a negative sign to the distance $\Delta h$ when the second index value is on the small side with respect to the reference curve. In this manner, the abnormality detecting part 114 switches the sign (positive or negative) assigned to the distance $\Delta h$ according to whether the second index value is on the large side or the small side with respect to the reference curve. Based on whether the distance $\Delta h$ assigned with the positive/negative sign is within a predetermined normal range (normal range), the abnormality detecting part 114 determines whether an abnormality occurs in the target device 10. The abnormality detecting part 114 may also perform a determination on an abnormality based on an absolute value of the distance $\Delta h$ without distinguishing between the positive and negative.

In addition, depending on the type of the target device 10, for example, when the second index value (load) is on the large side with respect to the reference curve, it may be considered that the possibility of abnormality is higher than when the second index value is on the small side with respect to the reference curve. Therefore, according to the sign (positive or negative) assigned to the distance $\Delta h$, the abnormality detecting part 114 may have a different threshold value of the distance $\Delta h$ used for determining whether an abnormality occurs in the target device 10. In other words, the threshold value on the positive side and the absolute value of the threshold value on the negative side that indicate the boundary of the normal range associated with $\Delta h$ may be different.

In this manner, instead of the absolute value of the distance $\Delta h$ from the reference curve to the point indicated by the first index value and the second index value, the abnormality detecting part 114 may select an appropriate threshold value according to the distance $\Delta h$ assigned with the positive/negative sign according to whether the second index value is on the side with a larger load or on the side with a smaller load with respect to the reference curve, to determine whether an abnormality occurs in the target device 10. Therefore, according to the configuration of the abnormality detecting part 114, it is possible to suppress an erroneous determination that an abnormality occurs even though an abnormality does not occur in the target device 10, and it is possible to appropriately perform an abnormality determination.

(Regarding Process Flow of Abnormality Detecting Device)

Figure 8:
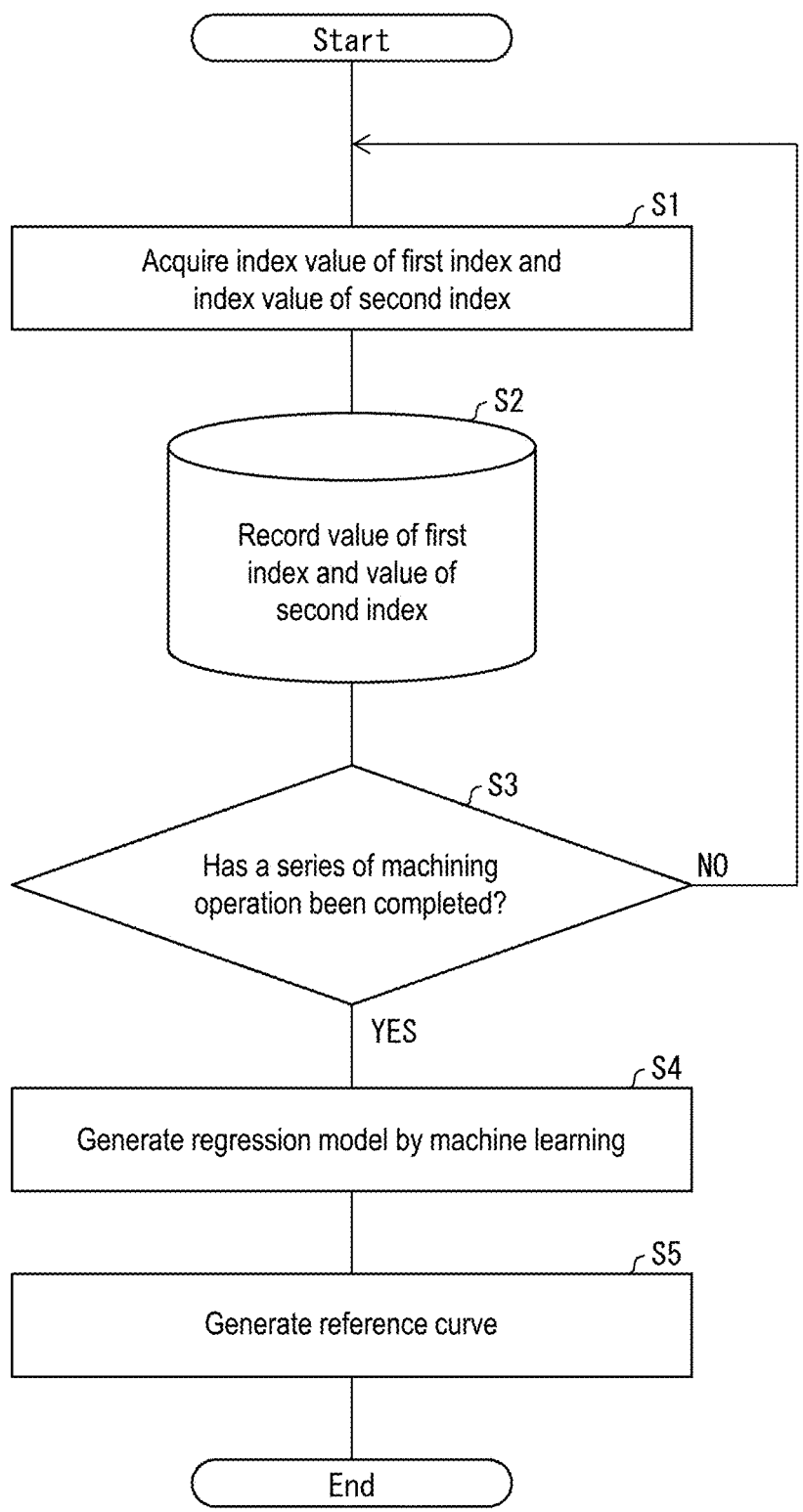
FIG. 8 is a flowchart showing a flow of a reference curve generation process by an abnormality detecting device.

FIG. 8 is a flowchart showing a flow of a reference curve generation process by the abnormality detecting device 100.

In the reference curve generation process, the control part 110 of the abnormality detecting device 100 first acquires, by the function of the acquisition part 111, a first index value associated with a first index and a second index value associated with a second index from the target device 10 in the normal state via the communication part 101 (step S1).

The control part 110 stores the first index value associated with the first index and the second index value associated with the second index acquired by the function of the acquisition part 111 to the storage part 120 (step S2).

The control part 110 determines whether a series of machining operation such as a press-fitting process and a caulking process performed by the target device 10 has been completed (step S3). When the control part 110 determines that the series of machining operation performed by the target device 10 has been completed (YES in step S3), the process proceeds to step S4. When it is determined that the series of machining operation performed by the target device 10 has not been completed (NO in step S3), returning to step S1, the control part 110 continues the collection of the first index value associated with the first index and the second index value associated with the second index.

By the function of the reference generation part 112, the control part 110 performs machine learning to generate a regression model for the first index value associated with the first index and the second index value associated with the second index related to the series of machining operation performed by the target device 10 that are stored in the storage part 120 (step S4).

With reference to the result of machine learning by the reference generation part 112, the control part 110 normalizes, by the function of the scale normalization part 113, the scales of the first index and the second index. Based on the scales normalized by the scale normalization part 113 and the result of machine learning, the reference generation part 112 sets a reference curve (normalized reference curve) associated with a series (one stroke from the start of operation to the completion of operation) of machining operation performed by the target device 10 (step S5).

The control part 110 stores the set reference curve to the storage part 120. Further, the control part 110 presets a normal range associated with $\Delta h$ and stores it to the storage part 120. The normal range may also be inputted by a user.

With reference to the reference curve set in step S5, the abnormality detecting device 100 monitors, by the function of the abnormality detecting part 114, the machining operation performed by the target device 10, and detects when an abnormality occurs in the machining operation performed by the target device 10.

Figure 9:
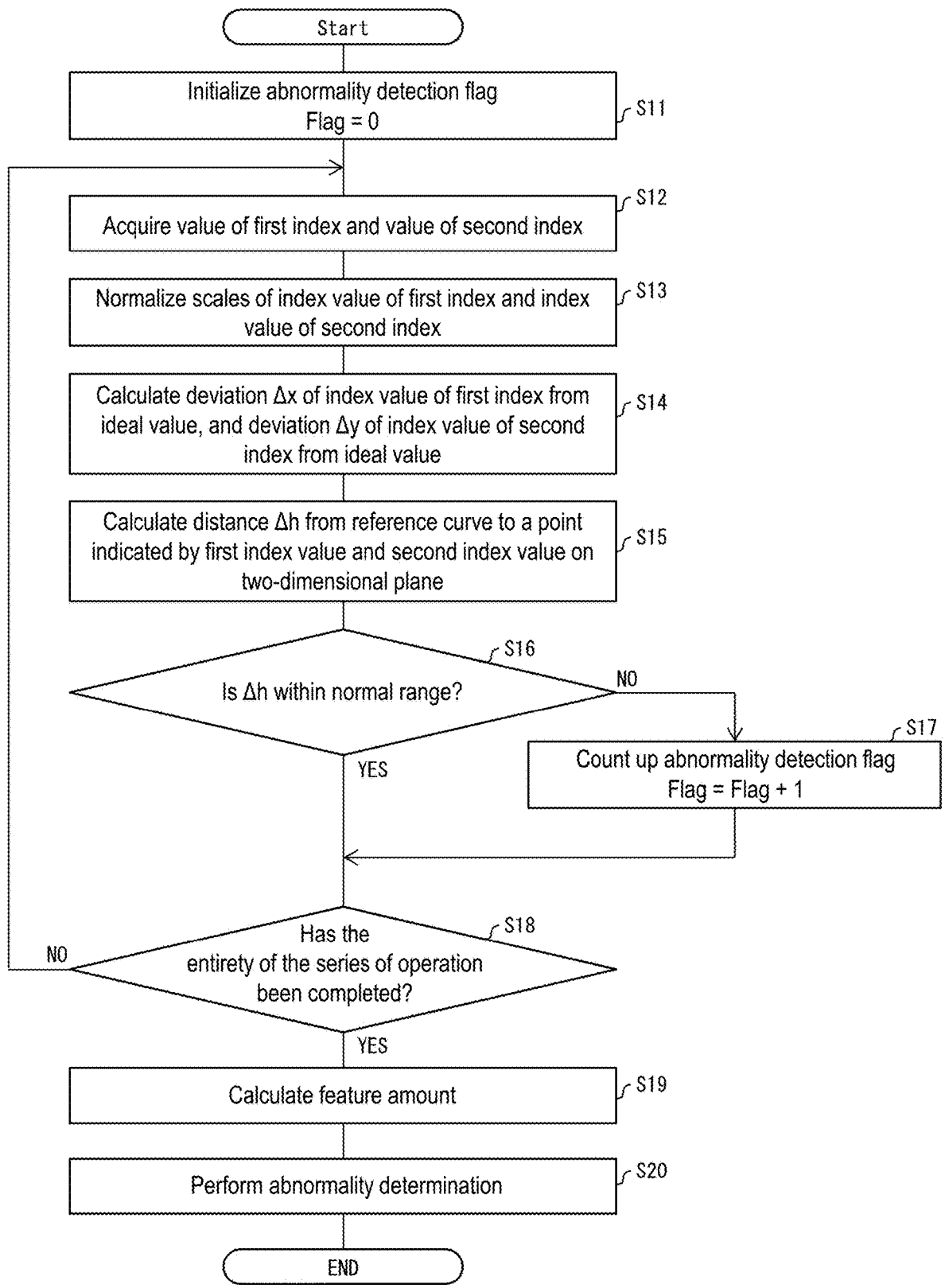
FIG. 9 is a flowchart showing a flow of an abnormality detecting process by the abnormality detecting device.

FIG. 9 is a flowchart showing a flow of an abnormality detecting process by the abnormality detecting device 100.

The abnormality detecting device 100 initializes an abnormality detection flag (Flag) (Flag=0) at a start timing of a series of operation in the machining operation of the target device 10 (step S11).

During the operation of the target device 10, the control part 110 of the abnormality detecting device 100 acquires, by the function of the acquisition part 111, a first index value associated with the first index and a second index value associated with the second index from the target device 10 via the communication part 101 (step S12).

The control part 110 normalizes, by the function of the scale normalization part 113, each of the first index value and the second index value acquired by the acquisition part 111 using (Formula 2) and (Formula 3) above (step S13). Herein, the scale normalization part 113 of the control part 110 normalizes each of the first index value and the second index value by using the maximum value and the minimum value on the reference curve before normalization.

The control part 110 calculates, by the function of the abnormality detecting part 114, a deviation $\Delta x$ of the normalized index value $x_{norm}$ of the first index deviating from an ideal value $x_{ideal}$, and a deviation $\Delta y$ of the normalized index value $y_{norm}$ of the second index deviating from an ideal value $y_{ideal}$, using (Formula 5) and (Formula 6) above (step S14).

The abnormality detecting part 114 calculates a distance $\Delta h$ from the reference curve to a point indicated by the first index value and the second index value on the two-dimensional plane according to (Formula 7) above using the deviation $\Delta x$ of the first index value and the deviation $\Delta y$ of the second index value (step S15).

The control part 110 stores the distance $\Delta h$ to the storage part 120.

Subsequently, the control part 110 determines, by the function of the abnormality detecting part 114, whether the distance $\Delta h$ is within a predetermined normal range corresponding to the sign (positive or negative) (step S16). When the control part 110 determines by the abnormality detecting part 114 that the distance $\Delta h$ is within the normal range (YES in step S16), the process proceeds to step S18. When the control part 110 determines by the abnormality detecting part 114 that the distance $\Delta h$ is outside the normal range (NO in step S16), the process proceeds to step S17.

When the distance $\Delta h$ is outside the normal range, the control part 110 detects that an abnormality occurs in the target device 10 and counts up the abnormality detection flag (Flag) (Flag=Flag+1), and the process proceeds to step S18 (step S17). "Flag" represents an integration period (integration section) in which the distance $\Delta h$ is outside the normal range.

When it is determined in step S16 that the distance $\Delta h$ is within the normal range, the control part 110 determines whether the entirety of the series of operation performed by the target device 10 has been completed (step S18). The control part 110 may also determine whether the entirety of the series of operation performed by the target device 10 has been completed with reference to, for example, the index value of the first index, the index value of the second index, and the reference curve. Further, the control part 110 may also acquire information as to whether the entirety of the series of operation has been completed from, for example, the target device 10 via the acquisition part 111.

When the control part 110 determines that the entirety of the series of operation performed by the target device 10 has been completed (YES in step S18), the process proceeds to step S19. When the control part 110 determines that the entirety of the series of operation performed by the target device 10 has not been completed (NO in step S18), returning to step S12, the process continues. Accordingly, during the series of operation of the target device 10, for example, at a predetermined time interval, the control part 110 continues the acquisition of the first index value associated with the first index and the second index value associated with the second index from the target device 10 via the communication part 101.

When the entirety of the series of operation performed by the target device 10 is completed, the control part 110 calculates, by the function of the abnormality detecting part 114, a feature amount of $\Delta h$ in the entirety of the series of operation (step S19). The abnormality detecting part 114 may calculate a mean, a variance, or a standard deviation of the distance $\Delta h$ calculated during the series of operation performed by the target device 10 as the feature amount. Further, the abnormality detecting part 114 may also calculate a feature amount in a frequency distribution of the distance $\Delta h$ calculated during the series of machining operation performed by the target device 10. Herein, the frequency distribution of the distance $\Delta h$ during the machining operation of the target device 10 may be a histogram with the distance $\Delta h$ during the machining operation taken as a bin, and the abnormality detecting part 114 may also calculate a kurtosis or a skewness in the histogram as the feature amount in the frequency distribution of the distance $\Delta h$ during the machining operation.

Based on the feature amount of the distance $\Delta h$ during the series of operation performed by the target device 10, the control part 110 determines, by the function of the abnormality detecting part 114, whether or not an abnormality occurs in the entirety of the series of operation of the target device 10 (step S20).

For example, if the kurtosis in the histogram with the distance $\Delta h$ taken as a bin is smaller than a predetermined threshold value, the abnormality detecting part 114 may determine that an abnormality occurs in the entirety of the series of operation of the target device 10. Further, if the skewness of the histogram with the distance $\Delta h$ taken as a bin is larger than a predetermined threshold value, the abnormality detecting part 114 may determine that an abnormality occurs in the entirety of the series of operation of the target device 10. Further, if the mean, the variance, or the standard deviation of the distance $\Delta h$ is larger than a predetermined threshold value, the abnormality detecting part 114 may determine that an abnormality occurs in the entirety of the series of operation of the target device 10.

Further, based on the feature amount of the distance $\Delta h$ and the count amount of the abnormality detection flag, the abnormality detecting part 114 may determine whether or not an abnormality occurs in the entirety of the series of operation of the target device 10. Even in the case where an abnormality of the target device 10 is suspected from the feature amount of the distance $\Delta h$, the abnormality detecting part 114 may determine that an abnormality does not occur in the series of operation of the target device 10 if the count amount (Flag) of the abnormality detection flag remains at the initial value (0). Further, even in the case where it is not determined that an abnormality occurs in the target device 10 from the feature amount of the distance $\Delta h$, the abnormality detecting part 114 may determine that an abnormality occurs in the series of operation of the target device 10 if the count amount (Flag) of the abnormality detection flag is larger than a predetermined value.

FIG. 10 to FIG. 13 are views showing graphs corresponding to the first index value associated with the first index and the second index value associated with the second index collected when a series of operation is performed multiple times in the target device 10.

Figure 10:
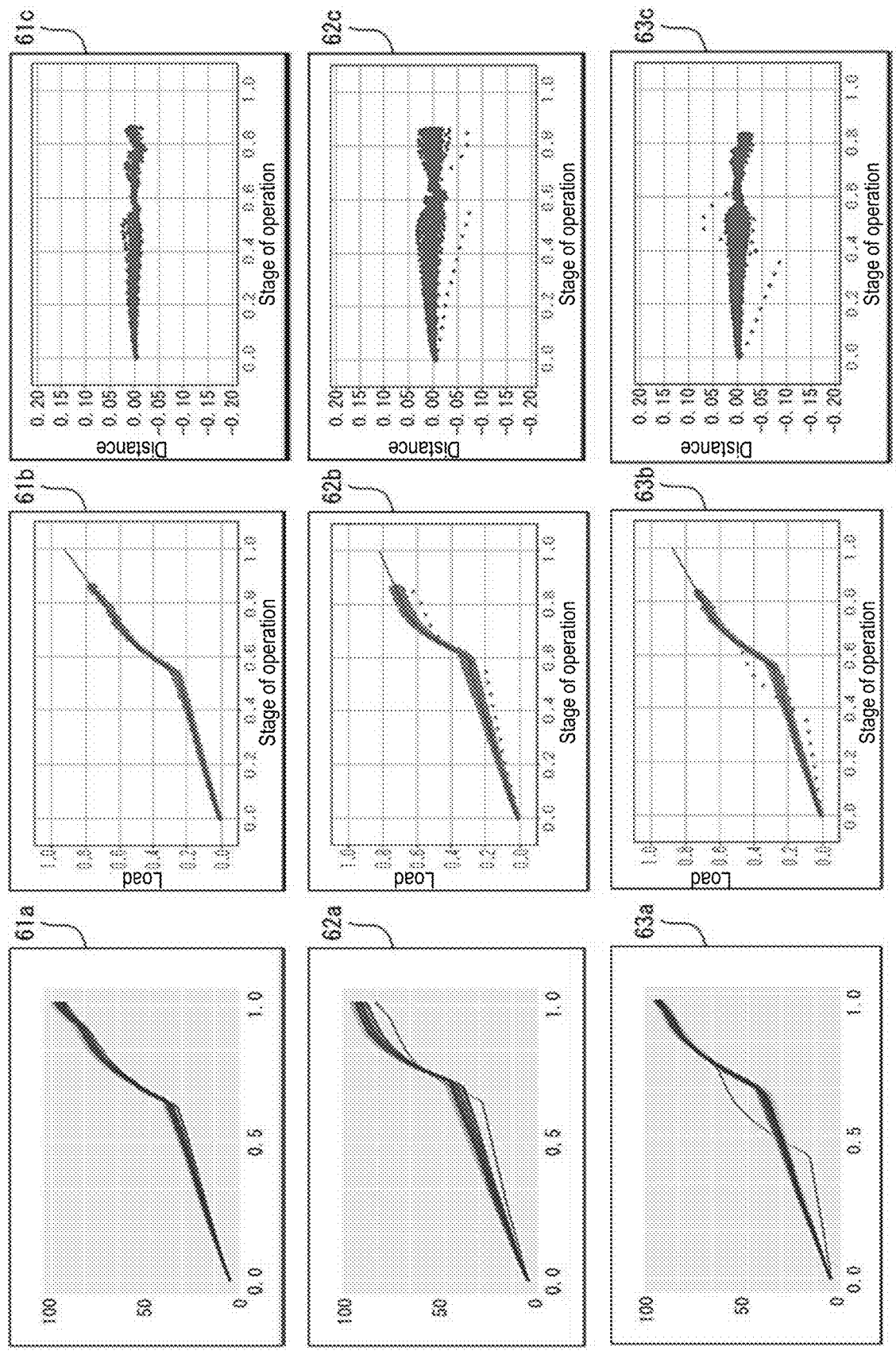
FIG. 10 shows graphs related to a series of operation in a target device.
Figure 11:
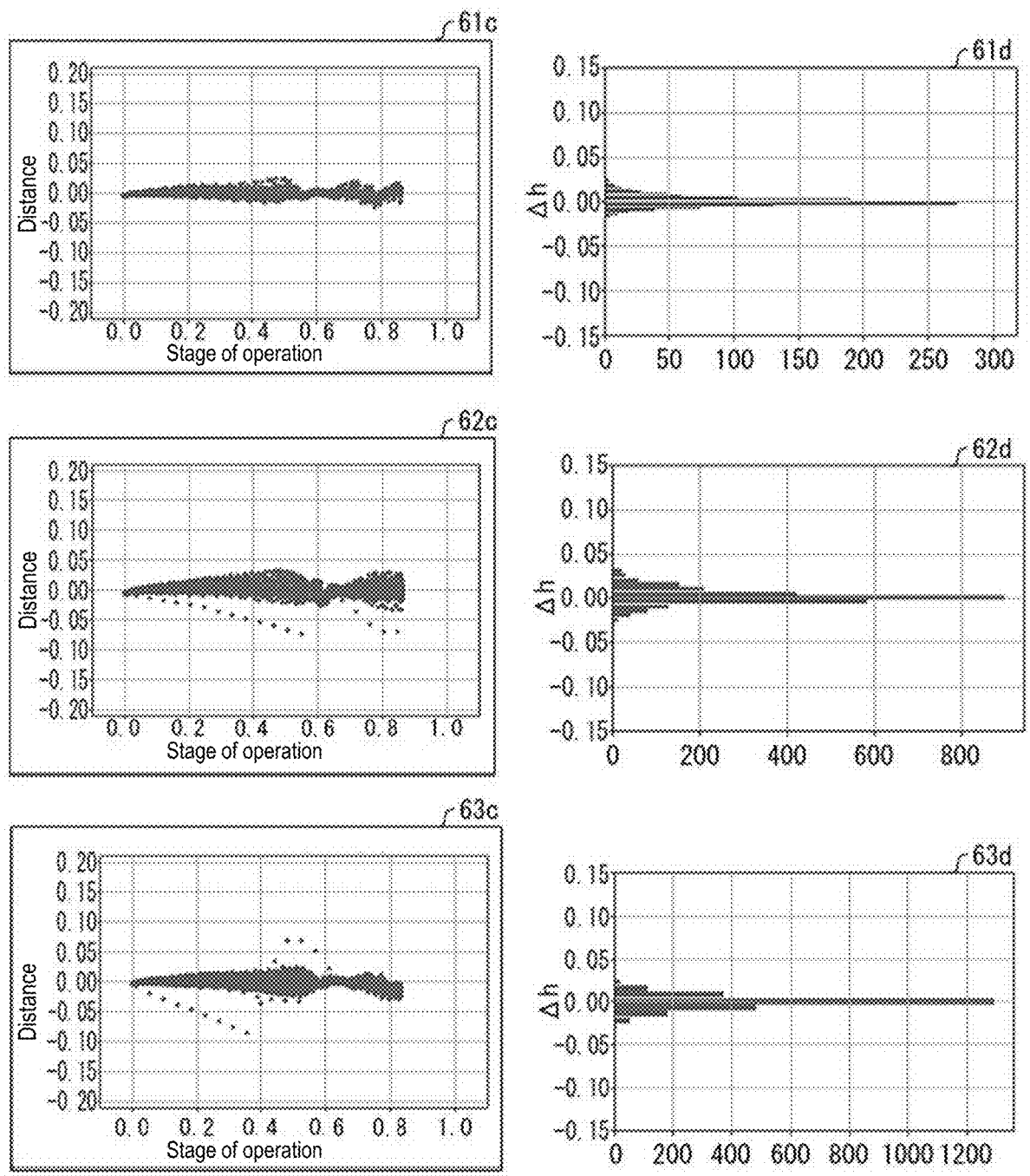
FIG. 11 shows graphs related to a series of operation in a target device.

Graphs 61a, 62a, and 63a of FIG. 10 are motion profiles showing the process of the operation of the target device 10 by the first index value (horizontal axis) and the second index value (vertical axis). Each of graphs 61b, 62b, and 63b of FIG. 10 is a graph obtained by respectively normalizing the first index value and the second index value of the graphs 61a, 62a, and 63a. Each of graphs 61c, 62c, and 63c of FIG. 10 and FIG. 11 is a graph (the horizontal axis is the first index) showing a distribution of the distance Δh from the reference curve to the point indicated by the normalized first index value and second index value respectively shown in the graphs 61b, 62b and 63b. Each of graphs 61d, 62d, and 63d of FIG. 11 is a histogram (the vertical axis is the distance Δh, and the horizontal axis is the frequency) in which the distance Δh respectively shown in the graphs 61c, 62c, and 63c is taken as a bin.

The example shown in the graphs 61a, 61b, 61c, and 61d of FIG. 10 and FIG. 11 shows a case where it is determined that there is no abnormality as a result of performing an abnormality determination based on the distance Δh as well as performing an abnormality determination based on the feature amount in the frequency distribution of the distance Δh for the operation of the target device 10. As shown in the graphs 61c and 61d, when the standard deviation in the frequency distribution of the distance Δh is within a predetermined range, and when the kurtosis and the skewness of the histogram with the distance Δh taken as a bin are within predetermined ranges, the abnormality detecting part 114 does not detect an abnormality in the operation performed by the target device 10 (determining that there is no abnormality).

The example shown in the graphs 62a, 62b, 62c, and 62d of FIG. 10 and FIG. 11 shows a case where the distance Δh sometimes falls outside the range of the threshold value on the negative side in the process of the operation of the target device 10. As shown in the graphs 62c and 62d, even if the distance Δh sometimes falls outside the range of the threshold value on the negative side, the standard deviation in the frequency distribution of the distance Δh may be within the predetermined range. Even in such a case, the abnormality detecting part 114 can detect an abnormality in the operation performed by the target device 10 based on whether the kurtosis or the skewness of the histogram with the distance Δh taken as a bin is within the predetermined range.

The abnormality detecting part 114 may also be configured to detect an abnormality of the target device 10 at a time point when detecting that the distance Δh falls outside the range of the threshold value on the negative side, or may also be configured to detect an abnormality of the target device 10 based on the standard deviation in the frequency distribution of the distance Δh in the entirety of the series of operation and the kurtosis or the skewness of the histogram with the distance Δh taken as a bin.

The example shown in the graphs 63a, 63b, 63c, and 63d of FIG. 10 and FIG. 11 show a case where the distance Δh sometimes falls outside the range of the threshold value on the positive side and the negative side in the process of the operation of the target device 10. As shown in the graphs 63c and 63d, even if the distance Δh falls outside the range of the threshold value on the positive side and the negative side, the standard deviation in the frequency distribution of the distance Δh may be within the predetermined range. Even in such a case, the abnormality detecting part 114 can detect an abnormality in the operation performed by the target device 10 based on whether the kurtosis or the skewness of the histogram with the distance Δh taken as a bin is within the predetermined range.

Figure 12:
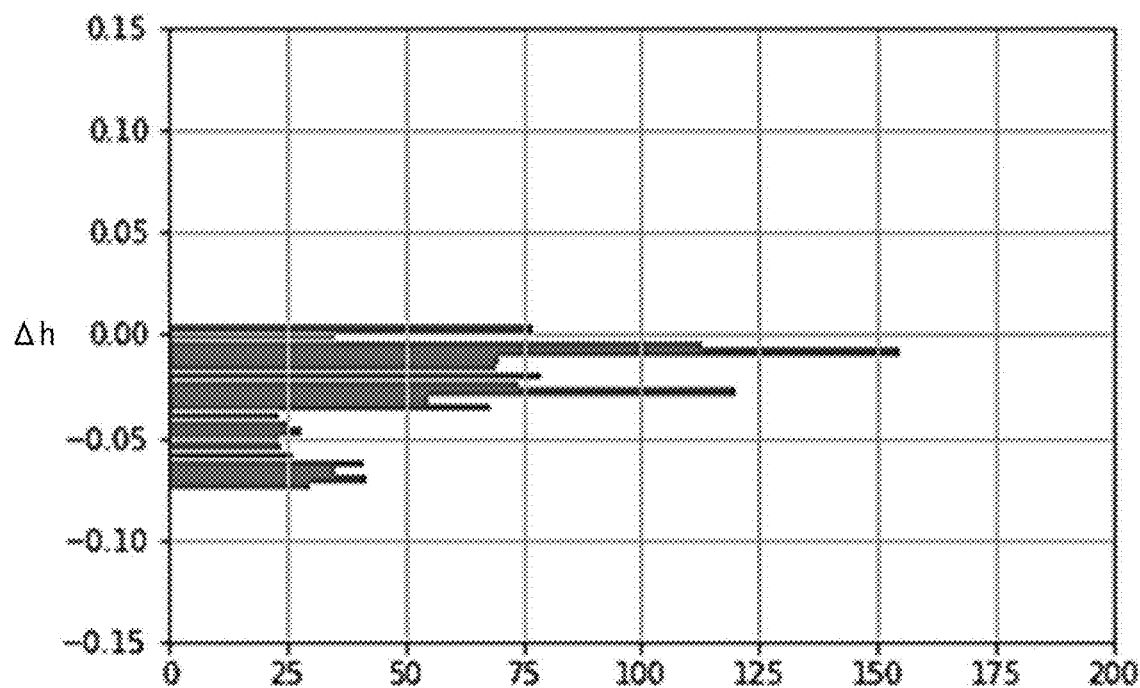
FIG. 12 shows an example of a histogram of a distance $\Delta h$ in a target device in which an abnormality occurs.

FIG. 12 shows an example of a histogram (the vertical axis is the distance Δh, and the horizontal axis is the frequency) of the distance Δh in the target device 10 in which an abnormality occurs. In the example shown in FIG. 12, the mean in the frequency distribution of the distance Δh is well below 0 (the mean is less than the threshold value on the negative side). The abnormality detecting part 114 may detect an abnormality of the target device 10 according to whether a statistical value such as the mean in the frequency distribution of the distance Δh is within a normal range.

Figure 13:
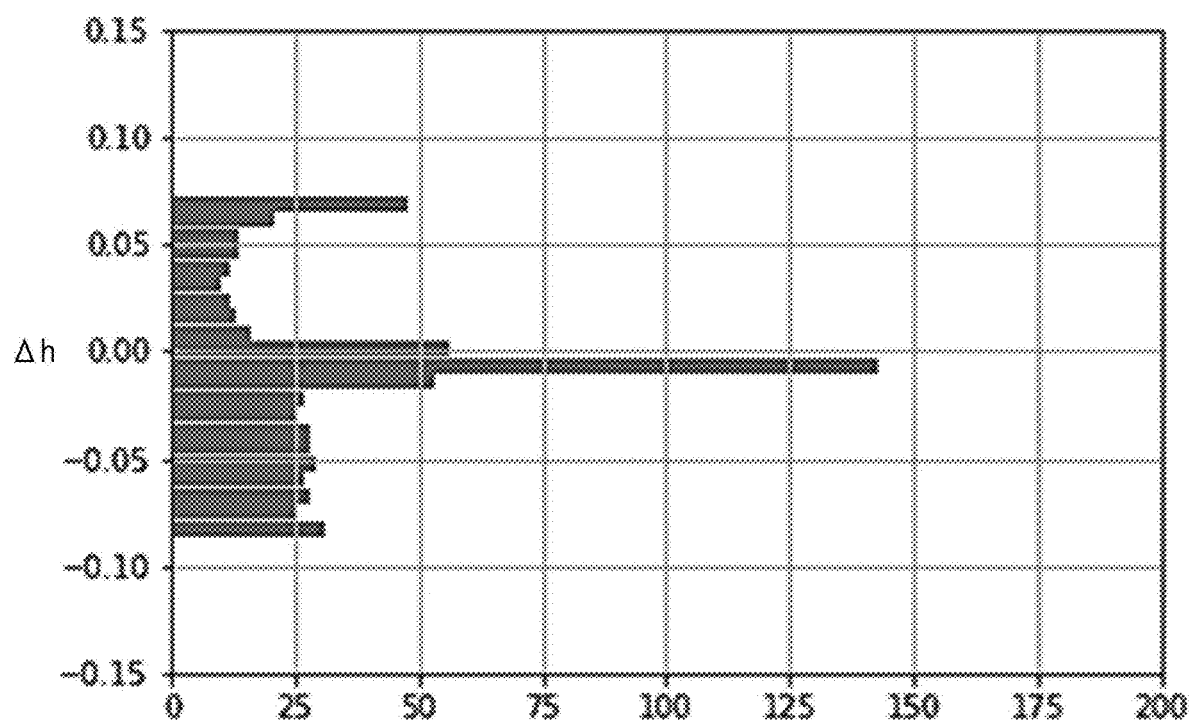
FIG. 13 shows another example of a histogram of a distance $\Delta h$ in a target device in which an abnormality occurs.

FIG. 13 shows another example of a histogram (the vertical axis is the distance Δh, and the horizontal axis is the frequency) of the distance Δh in the target device 10 in which an abnormality occurs. In the example shown in FIG. 13, the standard deviation in the frequency distribution of the distance Δh is larger than the threshold value. The abnormality detecting part 114 may detect an abnormality of the target device 10 according to whether a statistical value such as the standard deviation in the frequency distribution of the distance Δh is within a normal range.

(Other Examples of Target Device 10)

In the above description, the case where the target device 10 is a press machine driven by a servomotor as a power source has been taken as an example. However, the target device 10 is not limited to a press machine, but may be any device driven by a servomotor as a power source, and it is also possible to appropriately detect an abnormality by the abnormality detecting device 100. Further, the abnormality detecting process by the abnormality detecting device 100 is applicable not only to a servomotor but also to a stepping motor and other devices driven by a simple motor as a power source. Further, the abnormality detecting process by the abnormality detecting device 100 is applicable not only to a motor but also to a device driven by a general actuator such as a hydraulic or pneumatic actuator as a power source.

Figure 14:
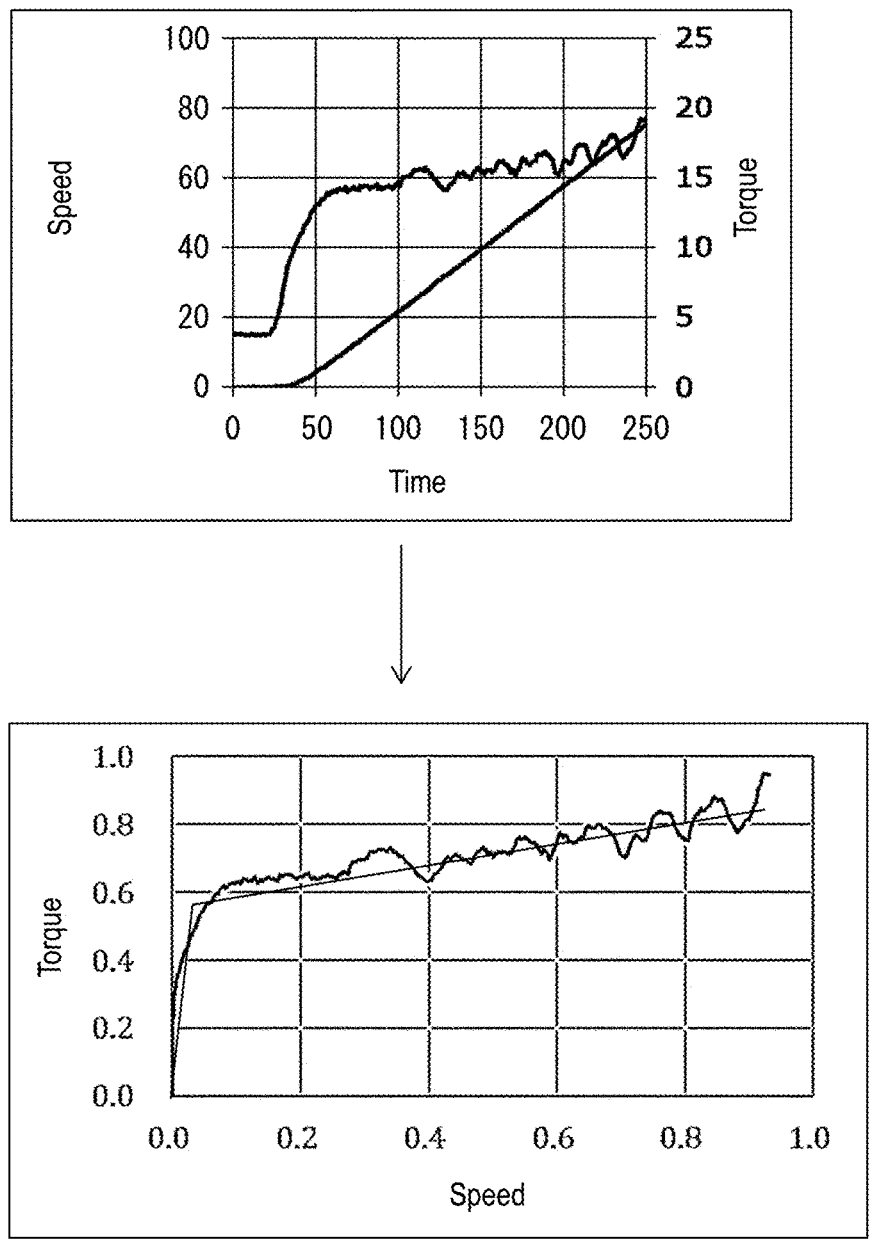
FIG. 14 is a view showing a first index value, a second index value, and a reference curve related to a series of operation of a target device which is not a press machine.

FIG. 14 is a view showing a first index value associated with a first index, a second index value associated with a second index, and a reference curve in a case where the target device 10 is a device other than a press machine. The upper graph of FIG. 14 is a view showing measured values $x_{act}$ and $y_{act}$ of the rotation speed of the servomotor which is the first index value associated with the first index and the torque of the servomotor which is the second index value associated with the second index in a series of operation of the target device 10, with the horizontal axis being time. The lower graph of FIG. 14 a graph showing normalized first index value $x_{norm}$ and second index value $y_{norm}$, and the reference curve on a two-dimensional plane with the first index being the x-axis and the second index being the y-axis.

In this manner, with the target device 10 being any device driven by a servomotor as a power source, it is possible to detect an abnormality based on the distance Δh between the reference curve and the point indicated by the normalized first index value $x_{norm}$ and second index value $y_{norm}$ on the two-dimensional plane with the first index being the x-axis and the second index being the y-axis.

[Example of Realization by Software]

The control block (specifically, the acquisition part 111, the reference generation part 112, the scale normalization part 113, and the abnormality detecting part 114) of the abnormality detecting device 100 may be realized by a logic circuit (hardware) formed in an integrated circuit (IC chip) or the like, or may be realized by software.

In the latter case, the abnormality detecting device 100 includes a computer executing commands of a program which is software realizing each function. The computer includes, for example, one or more processors and a computer-readable recording medium that stores the program. Then, in the computer, the objective of the present invention is achieved by the processor reading the program from the recording medium and executing the program. As the processor, for example, a CPU (central processing unit) may be used. As the recording medium, a "non-transitory tangible medium" such as a ROM (read only memory) and the like, a tape, a disk, a card, a semiconductor memory, a programmable logic circuit, etc. may be used. Further, a RAM (random access memory) or the like for developing the program may be further provided. Further, the program may be supplied to the computer via an arbitrary transmission medium (communication network, broadcast wave, etc.) capable of transmitting the program. One aspect of the present invention may also be realized in the form of a data signal embedded in a carrier wave, in which the program is embodied by electronic transmission.

SUMMARY

To solve the above problems, an abnormality detecting device according to an aspect of the present invention is an abnormality detecting device detecting an abnormality of a target device, and includes an acquisition part and an abnormality detecting part. The acquisition part acquires a first index value associated with a first index and a second index value associated with a second index in an operation of the target device. The abnormality detecting part detects an abnormality of the target device based on a distance from a predetermined reference curve to a point indicated by the first index value and the second index value on a two-dimensional plane with the first index and the second index being axes.

Further, to solve the above problems, an abnormality detecting method according to an aspect of the present invention is an abnormality detecting method executed in an abnormality detecting device detecting an abnormality of a target device, and includes: an index value acquisition step of acquiring a first index value associated with a first index and a second index value associated with a second index in an operation of the target device; and an abnormality detecting step of detecting an abnormality of the target device based on a distance from a predetermined reference curve to a point indicated by the first index value and the second index value on a two-dimensional plane with the first index and the second index being axes.

According to the above configuration, it is possible to appropriately perform an abnormality determination in the operation process of the target device.

Further, in the abnormality detecting device according to an aspect of the present invention, the first index value is a value related to a stage of the operation of the target device, and the second index value is a value related to a load of the operation of the target device.

According to the above configuration, it is possible to appropriately perform an abnormality determination at each stage of the operation of the target device.

Further, the abnormality detecting device according to an aspect of the present invention includes a scale normalization part that individually normalizes each of a scale of the first index value on the two-dimensional plane and a scale of the second index value on the two-dimensional plane.

According to the above configuration, since each index value is appropriately normalized to perform the abnormality determination, it is possible to appropriately perform the abnormality determination.

Further, in the abnormality detecting device according to an aspect of the present invention, the abnormality detecting part switches a sign of positive and negative assigned to the distance according to whether the second index value is on a side with a large load or a side with a small load with respect to the reference curve, and detects an abnormality of the target device based on the distance assigned with the sign.

According to the above configuration, it is also possible to appropriately perform an abnormality determination in a case where there is no abnormality even if the index value is smaller than the reference curve to some extent, but there is a high possibility of abnormality when the index value is higher than the reference curve.

Further, in the abnormality detecting device according to an aspect of the present invention, the abnormality detecting part changes a threshold value of the distance from the reference curve, which is a threshold value used for determination on presence or absence of an abnormality of the target device, according to the sign assigned to the distance.

According to the above configuration, it is possible to appropriately perform an abnormality determination even if the determination on presence or absence of an abnormality differs depending on the sign (positive or negative) of the distance.

Further, in the abnormality detecting device according to an aspect of the present invention, the abnormality detecting part detects an abnormality of the target device based on a standard deviation of the distance during a machining operation.

Further, in the abnormality detecting device according to an aspect of the present invention, the abnormality detecting part detects an abnormality of the target device based on a feature amount in a frequency distribution of the distance during a machining operation.

Further, in the abnormality detecting device according to an aspect of the present invention, the feature amount in the frequency distribution is a kurtosis in a histogram in which the distance during the machining operation is taken as a bin.

Further, in the abnormality detecting device according to an aspect of the present invention, the feature amount in the frequency distribution is a skewness in a histogram in which the distance during the machining operation is taken as a bin.

Further, an abnormality detecting program according to an aspect of the present invention is an abnormality detecting program for causing a computer to function as the above abnormality detecting device, and causes a computer to function as the acquisition part and the abnormality detecting part.

The present invention is not limited to the above embodiments, and various changes may be made within the scope of the claims. The technical scope of the present invention also includes embodiments obtained by appropriately combining the technical means disclosed in the different embodiments.

What is claimed is:
1. An abnormality detecting device which detects an abnormality of a target device having a servomotor, a press tool, a load cell, and a displacement sensor, the abnormality detecting device comprising:

a processor, configured to:
  initialize an abnormality detection flag at a start time of series of machining operations using the servomotor or the press tool;
  acquire a first index value associated with a first index by using the displacement sensor to measure a position of the servomotor or a position of the press tool, and acquire a second index value associated with a second index in the machining operations of the target device by using the load cell to measure a load applied to the servomotor or the press tool, wherein the first index value is a value related to a stage of the machining operation of the servomotor or the press tool, and the second index value is a value related to a load of the machining operation of the the servomotor or the press tool; and
  detect an abnormality of the servomotor or the press tool based on a distance from a predetermined reference curve to a point indicated by the first index value and the second index value on a two-dimensional plane with the first index and the second index being axes, comprising to:
    acquire a first ideal value and a second ideal value respectively corresponding to the first index value and the second index value from the predetermined reference curve;
    calculate a distance from the predetermined reference curve to a point indicated by the first index value and the second index value based on the first index value, the second index value, the first idea value, and the second ideal value;
    switch a sign of positive and negative assigned to the distance according to whether the second index value is on a side with a large load or a side with a small load with respect to the reference curve;
    detect the abnormality of the target device based on the distance assigned with the sign;
    count up the abnormality detection flag by one for each detected abnormality of the target device; and
    determine that occurrence of the abnormality during the machining operations of the servomotor or press tool when a number flag is greater than a predetermined threshold.

2. The abnormality detecting device according to claim 1, wherein the processor is further configured to:
  individually normalize each of a scale of the first index value on the two-dimensional plane and a scale of the second index value on the two-dimensional plane.

3. The abnormality detecting device according to claim 1, wherein the processor changes a threshold value of the distance from the reference curve, which is a threshold value used for determination on presence or absence of an abnormality of the target device, according to the sign assigned to the distance.

4. The abnormality detecting device according to claim 1, wherein the processor detects the abnormality of the target device based on a standard deviation of the distance during a machining operation of the target device.

5. The abnormality detecting device according to claim 1, wherein the processor detects the abnormality of the target device based on a feature amount in a frequency distribution of the distance during a machining operation of the target device.

6. The abnormality detecting device according to claim 5, wherein the feature amount in the frequency distribution is a kurtosis in a histogram in which the distance during the machining operation of the target device is taken as a bin.

7. The abnormality detecting device according to claim 5, wherein the feature amount in the frequency distribution is a skewness in a histogram in which the distance during the machining operation of the target device is taken as a bin.

8. An abnormality detecting method executed in an abnormality detecting device which detects an abnormality of a target device having a servomotor, a press tool, a load cell, and a displacement sensor, the abnormality detecting method comprising:
  initializing an abnormality detection flag at a start time of series of machining operations using the servomotor or the press tool;
  acquiring a first index value associated with a first index by using the displacement sensor to measure a position of the servomotor or a position of the press tool, and a second index value associated with a second index in the machining operations of the target device by using the load cell to measure a load applied to the servomotor or the press tool, wherein the first index value is a value related to a stage of the machining operation of the servomotor or the press tool, and the second index value is a value related to a load of the machining operation of the servomotor or the press tool; and
  detecting an abnormality of the servomotor or the press tool based on a distance from a predetermined reference curve to a point indicated by the first index value and the second index value on a two-dimensional plane with the first index and the second index being axes, comprising:
    acquiring a first ideal value and a second ideal value respectively corresponding to the first index value and the second index value from the predetermined reference curve;
    calculating a distance from the predetermined reference curve to a point indicated by the first index value and the second index value based on the first index value, the second index value, the first idea value, and the second ideal value;
    switching a sign of positive and negative assigned to the distance according to whether the second index value is on a side with a large load or a side with a small load with respect to the reference curve;
    detecting the abnormality of the target device based on the distance assigned with the sign
    counting up the abnormality detection flag by one for each detected abnormality of the target device; and
    determining that occurrence of the abnormality during the machining operations of the servomotor or press tool when a number flag is greater than a predetermined threshold.

9. A non-transitory computer readable storage medium, storing an abnormality detecting program for causing a computer to function as the abnormality detecting device according to claim 1.

10. The abnormality detecting device according to claim 2, wherein the processor detects the abnormality of the target device based on a standard deviation of the distance during a machining operation of the target device.

11. The abnormality detecting device according to claim 2, wherein the processor detects the abnormality of the target device based on a feature amount in a frequency distribution of the distance during a machining operation of the target device.

* * * * *